United States Patent
Grundmann

(10) Patent No.: US 6,655,419 B1
(45) Date of Patent: Dec. 2, 2003

(54) METHOD FOR CONDITIONING A LIQUID IN RECEPTACLE FITTED WITH A POSITIVE PRESSURE VALVE

(75) Inventor: Joachim Grundmann, Montreuil (FR)

(73) Assignee: L'Air Liquide - Societe Anonyme a Directoire et Conseil de Surveillance pour l'Etude et l'Exploitation des Procedes Georges Claude, Paris Cedex (FR)

( * ) Notice: Subject to any disclaimer, the term of this patent is extended or adjusted under 35 U.S.C. 154(b) by 0 days.

(21) Appl. No.: 09/959,289

(22) PCT Filed: Apr. 5, 2000

(86) PCT No.: PCT/FR00/00852

§ 371 (c)(1),
(2), (4) Date: Oct. 19, 2001

(87) PCT Pub. No.: WO00/63610

PCT Pub. Date: Oct. 26, 2000

(30) Foreign Application Priority Data

Apr. 19, 1999 (FR) .............................................. 99 04884

(51) Int. Cl.⁷ ................................................. B65B 3/04
(52) U.S. Cl. ................................ 141/3; 141/85; 141/89
(58) Field of Search ............................. 141/3, 4, 11, 18, 141/83, 85, 89, 92; 137/15.01, 15.08, 15.12

(56) References Cited

U.S. PATENT DOCUMENTS

| | | | |
|---|---|---|---|
| 3,292,895 A | * | 12/1966 | Leger |
| 3,981,328 A | * | 9/1976 | Yonezawa |
| 4,402,340 A | * | 9/1983 | Lockwood, Jr. |
| 5,007,614 A | * | 4/1991 | Lockwood, Jr. |

FOREIGN PATENT DOCUMENTS

EP        0 708 281        * 4/1996

* cited by examiner

Primary Examiner—Timothy L. Maust
(74) Attorney, Agent, or Firm—Young & Thompson

(57) ABSTRACT

A method for conditioning a receptacle which can contain a pressurized liquid, e.g. a gas cylinder, whereby the receptacle is fitted with a positive pressure valve into which a gas with a water or water vapor content of less than 40 ppmv is introduced after the internal volume, i.e. the inside, of the receptacle has been dried in order to remove any water vapor therein. A receptacle conditioned in such a way can be used in a welding operation, especially TIG, MIG or MAG welding, or in a plasma-arc cutting operation.

10 Claims, 2 Drawing Sheets

METHOD FOR CONDITIONING A LIQUID IN RECEPTACLE FITTED WITH A POSITIVE PRESSURE VALVE

BACKGROUND OF THE INVENTION

The invention relates to a process for filling a filling container capable of containing a pressurized fluid with said fluid, especially a pressurized gas bottle, which container is fitted with a regulator of the positive-pressure type, and to its use, in particular in a welding, cutting or similar process.

When carrying out a welding process, especially an MIG (Metal Inert Gas), MAG (Metal Active Gas) or TIG (Tungsten Inert Gas) welding process, it is common practice to use a gaseous shielding atmosphere around the welded zone in order to prevent or minimize the contamination of the welded joint with atmospheric impurities.

This is because it is known that gaseous atmospheric impurities can degrade the properties of a welded joint in the absence of gas shielding.

In particular, hydrogen and water vapor may cause problems of cold cracking of the welded joint.

Likewise, nitrogen tends to degrade the mechanical properties of the joint (Charpy V-notch test) and the presence of oxygen leads to a reduction in the ductility of the welded joint.

However, given that the shielding gases used may themselves also contain impurities of this type, it is necessary to use, as shielding gases, gases of controlled purity, that is to say gases containing an impurity content below a specified maximum threshold, above which the quality of the welded joint produced is no longer acceptable.

Thus, European standard EN 439 recommends that the welding gases must have a water or water-vapor content less than or equal to 40 ppm by volume upon delivery to the user site, that is to say to the customer.

Moreover, similar remarks may be made regarding the gases used in cutting, particularly plasma cutting, in which the quality of the cutting gas has an appreciable influence on the life of the electrode of the plasma torch.

It therefore follows that, at the present time, pressurized fluid containers, such as bottles containing a gas or a gas mixture at a pressure, in general, of 150 bar to 300 bar, usually have, upon delivery to the site of use, impurity contents, particularly water or water-vapor contents, fully in compliance with the maximum permissible thresholds, for example a maximum water or water-vapor content of 40 ppmv.

However, it has been found that as the containers gradually empty, that is to say as the fluid contained therein is gradually used, water or water vapor is deposited on the internal walls of the bottle and, when the pressure within the container becomes less than approximately $70 \times 10^5$ Pa, water is then entrained by the gas leaving the container.

There is therefore a very marked increase in the water-vapor content in the gas leaving the container, which content may substantially exceed the maximum permissible threshold, that is to say it may exceed 40 ppmv, as shown in the appended figure.

It will be immediately understood that the increase in the water-vapor content of the gas leaving the container has a negative impact on the quality of the welded joint produced, as explained above.

Consequently, the problem that then arises is to be able, as the container empties during use, to guarantee that the water-vapor content of the gas leaving said container is always below the maximum permissible threshold, for example a water-vapor content of at most 40 ppmv, and this being achieved whatever the pressure within the container, that is to say including pressures below approximately $70 \times 10^5$ Pa.

SUMMARY OF THE INVENTION

The solution provided by the present invention is therefore a process for filling a filling container capable of containing pressurized fluid with a fluid, particularly a gas, said container being fitted with a positive-pressure regulator having closure means which impede and/or prevent any inflow and/or any outflow of fluid when the pressure in the bottle falls below a specified positive pressure limit (PPL) value, that is to say a regulator provided with closure means, particularly a valve flap or the like, which shut or stop any flow of fluid, entering or leaving the bottle, when the pressure in the bottle reaches a specified pressure limit value, for example a pressure of less than or equal to $5 \times 10^5$ Pa, thereby making it possible to prevent the flow of the gas, and therefore any inflow of atmospheric impurities or of air into the container.

According to the process of the invention, a fluid having a water or water-vapor content of less than 40 ppmv is introduced into the container fitted with the positive-pressure regulator, the inside of the filling container having been subjected to a drying operation, prior to introduction of the fluid.

Depending on the case, the filling process of the invention may include one or more of the following characteristics:
- the drying operation is carried out by flushing the inside of the bottle with a stream of dry gas;
- the drying operation is stopped when the water or water-vapor content in the bottle is below 20 ppmv, preferably below 5 ppmv;
- introduction of the fluid into the container is stopped when the pressure exerted in said container is between $100 \times 10^5$ Pa and $400 \times 10^5$ Pa, preferably between $150 \times 10^5$ Pa and $300 \times 10^5$ Pa;
- the fluid is a gas chosen from argon, helium, oxygen, $CO_2$, nitrogen, CO, nitrogen oxides ($N_xO_y$), $SO_2$, $SF_6$, xenon, neon, krypton, hydrogen, $CH_4$, $SiH_4$, $C_2H_4$ and mixtures thereof, or any other gaseous compound;
- a fluid at a pressure of between $10^5$ Pa and $300 \times 10^5$ Pa is introduced into the container;
- the closure means shut for a positive pressure limit (PPL) of greater than $1.5 \times 10^5$ Pa and of less than $10 \times 10^5$ Pa, preferably of less than or equal to $5 \times 10^5$ Pa;
- the closure means comprise a valve flap and/or a spring;
- the fluid is in liquid and/or gaseous form;
- the container is chosen from bottles made of a metal, a metal alloy or a composite, especially bottles made completely or partly of Kevlar™ fibers.

In addition, the invention also relates to the use of a container filled by the filling process of the invention, fitted with a regulator of the positive-pressure type and containing a fluid at a pressure of between $5 \times 10^5$ Pa and $400 \times 10^5$ Pa, in a welding operation, particularly a TIG, MIG or MAG welding operation, or a plasma cutting operation.

The invention will now be described in greater detail with the aid of comparative examples and with reference to the appended figures, these being given by way of illustration but implying no limitation.

DETAILED DESCRIPTION OF THE PREFERRED EMBODIMENTS

Figure 1:
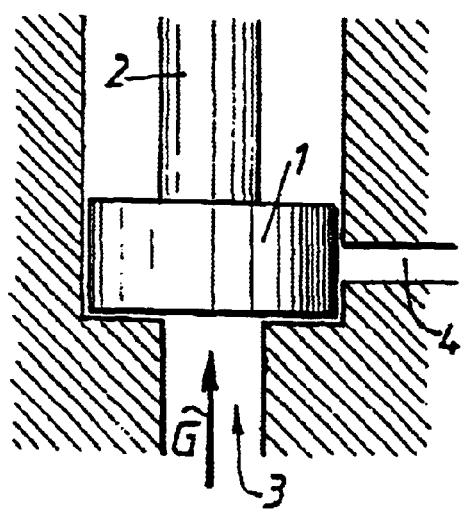
FIGS. 1 and 2 show schematically the operation of a regulator according to the prior art.

More specifically, FIG. 1 is a partial diagram, seen in longitudinal section, of a gas bottle regulator of the conventional type normally used for controlling the outflow of gas, which regulator comprises a member 2 able to move axially due to the effect of the operator screwing or unscrewing the handwheel (not illustrated), said member 2 being integral with a valve flap 1 for closing off the gas passage 3.

Figure 2:
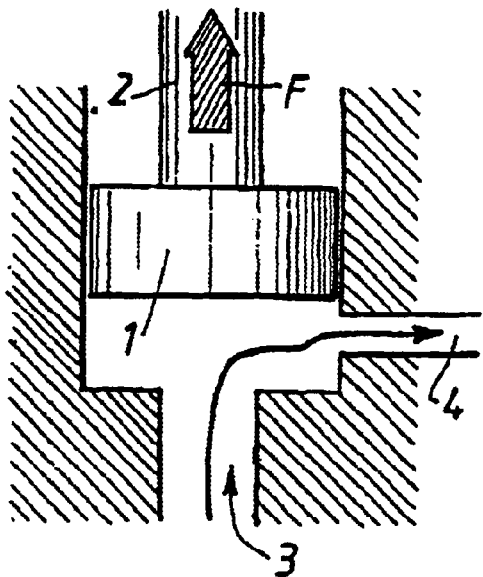

As illustrated in FIG. 2, when the operator wishes to release gas G contained in the gas bottle, he rotates the regulator handwheel in the direction of unscrewing, thereby causing an upward axial movement (in the direction of the arrow F) of the member 2 and of the valve flap 1.

In other words, it therefore causes the valve closure flap 3 to be lifted off its seat, thus releasing the gas G, which enters the gas outlet passage 4, that is to say the outlet fitting of the regulator.

In this case, if the pressure in the bottle becomes low, for example when the bottle is virtually empty, atmospheric air laden with impurities can be introduced into the bottle and, consequently, contaminate the gas which is contained therein or else the gas that will fill the gas bottle during the next filling.

Figure 3:
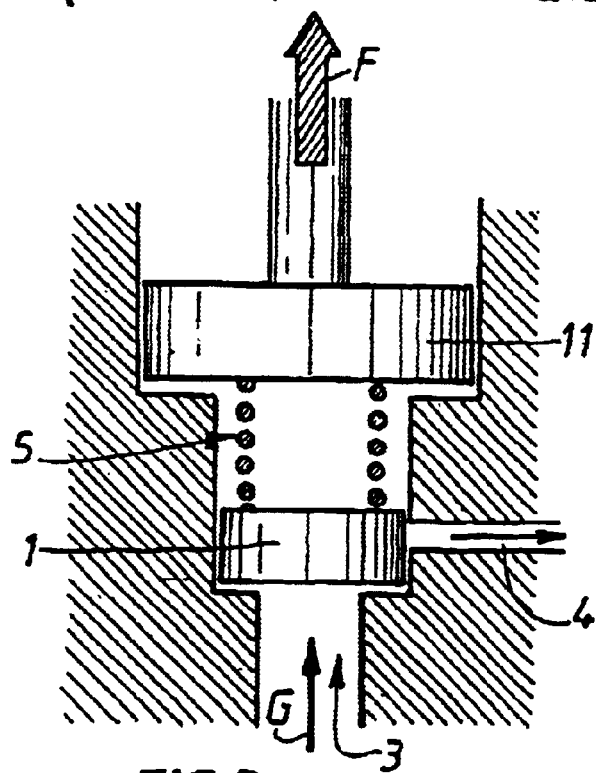
FIG. 3 shows a positive-pressure regulator according to the invention.

On the other hand, FIG. 3 shows diagrammatically a positive-pressure regulator according to the invention, this also being seen in partial section and also comprising a valve flap 1 for closing off the gas passage 3 and a member 11 able to move axially and acting on said valve flap 1 in order to allow gas to leave or prevent gas from leaving the bottle fitted with this regulator.

However, in this case, the member 11 able to move axially acts on the valve flap 1, which itself is able to move axially, via a resilient means, such as a spring 5, whose stiffness is chosen depending on the desired residual gas pressure in the bottle, that is to say the desired positive pressure limit (PPL), for example 5 bar.

As may be seen in FIG. 3, a spring 5 is positioned between the valve flap 1 and the member 2 and thus exerts an elastic force on these 2 elements, particularly on the valve flap 1.

Consequently, if the regulator is open and the residual gas pressure in the bottle falls below the desired residual pressure (for example 5 bar) and therefore below the elastic force or stiffness of the spring 5, the spring will then push the valve flap downward, that is to say toward its seat, which tends to close off the outlet passage 3 for the gas G but also, and above all, to prevent any inopportune inflow of ambient air or of other contaminants, such as water vapor, into the bottle via the passages 4 and 3.

It will be immediately understood that, by virtue of such a positive-pressure regulator, it is possible to fully solve the problem of contamination of the gas contained in the gas bottles with atmospheric impurities, such as water vapor.

Moreover, it should be noted that the valve flap 1 may also be of the type which moves horizontally rather than axially.

EXAMPLES

Comparative tests were carried out, on the one hand, with a gas bottle fitted with a draining regulator of the conventional type and filled with gas using a filling process according to the prior art and, on the other hand, with a gas bottle fitted with a draining regulator of the positive-pressure type according to the invention and filled according to the filling process of the invention, especially in which the bottle is subjected to a drying operation prior to introduction of the gas.

The gas used is a binary mixture of argon (approx. 82%) and $CO_2$ (approx. 18%) containing less than 40 ppmv of water vapor.

The tests were carried out on bottles with initial pressures of $150 \times 10^5$ Pa, $200 \times 10^5$ Pa and $300 \times 10^5$ Pa, said bottles being gradually drained and the water-vapor content of the gas leaving each of the bottles being constantly measured until each bottle was completely empty.

Figure 4:
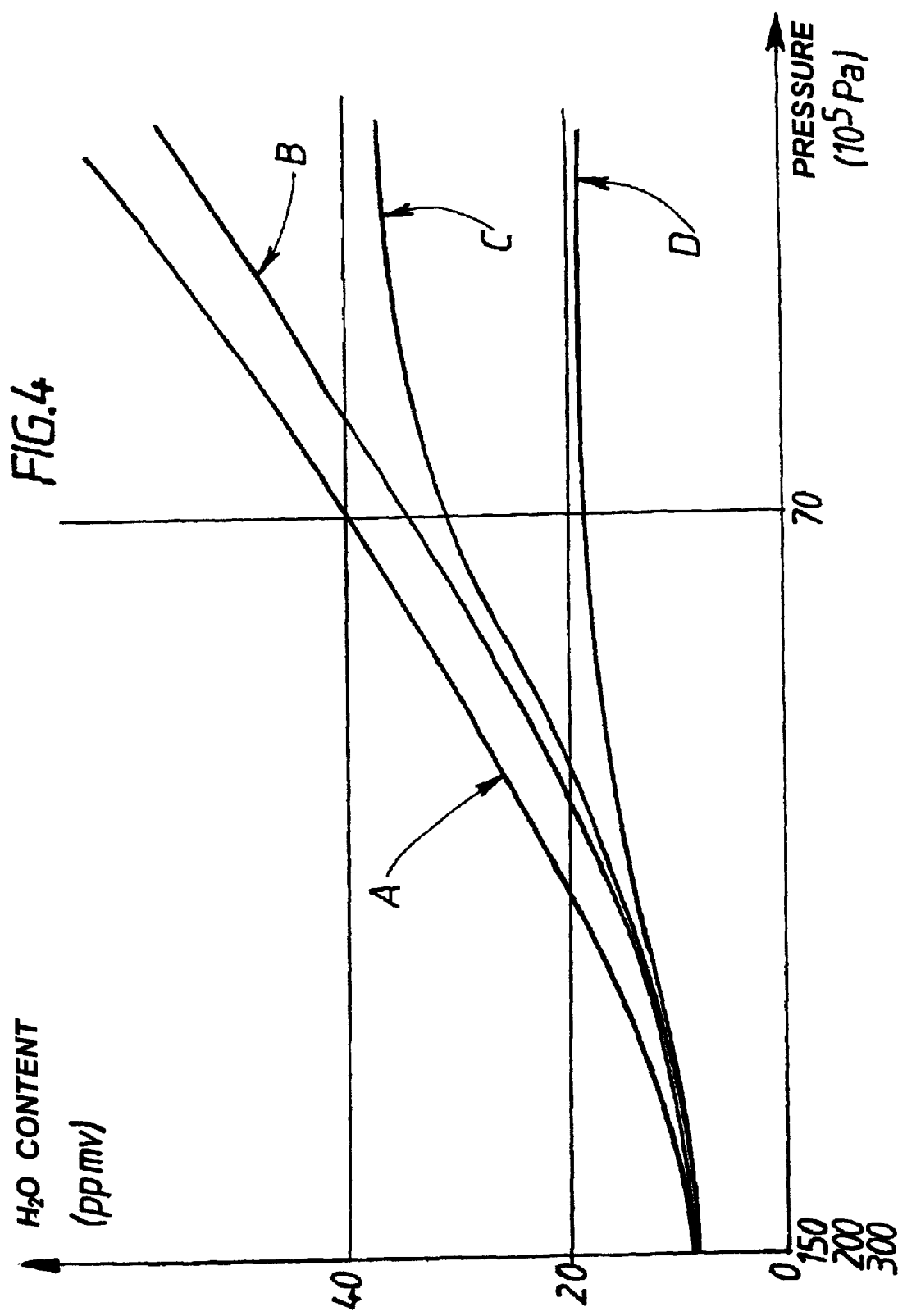
FIG. 4 shows a graph of pressure versus water content for the prior art and the present invention.

The curves obtained are shown in the appended FIG. 4.

More specifically, it may be seen that, for the bottles fitted with a draining regulator of the conventional type, the water-vapor content of the gas leaving the regulator becomes markedly greater than 40 ppmv when the pressure in the bottle falls below approximately $70 \times 10^5$ Pa (curves A and B), this being so whatever the initial pressure in the bottle (150, 200 or $300 \times 10^5$ Pa).

Indeed, for these bottles, water-vapor contents of 100 ppmv to 300 ppmv were measured at the end of draining for a temperature of 15° C. and a pressure of $3 \times 10^5$ Pa.

On the other hand, surprisingly, the bottles fitted with a draining regulator of the positive-pressure type according to the invention make it possible to guarantee a water-vapor content of the outflowing gas which is always below 40 ppmv (curves C and D), under the same temperature and pressure conditions during the measurements.

In other words, by drying the inside of a gas bottle, fitting this bottle with a positive-pressure regulator (for example with a pressure limit value of less than $5 \times 10^5$ Pa) and by then filling it with the gas having a water-vapor content below a specified threshold, as recommended by the present invention, for example a content below 20 ppmv, it is possible to guarantee that the gas leaving the bottle has an impurity content which is always permissible throughout the draining of the bottle, whatever the pressure within said bottle, that is to say whether the bottle is full, partially full or empty.

In general, the use of a positive-pressure regulator helps to prevent or minimize the inopportune inflow of contaminants, such as water vapor (moisture), oxygen and/or nitrogen, into the bottle.

Furthermore, complementary tests have demonstrated that a bottle according to the invention filled and emptied 200 times in a row always delivers a gas having a water-vapor content below 10 ppmv (measured at 3 bar and 15° C.) if the filling process according to the invention is carried out.

In addition, by virtue of the present invention, it is also possible to prevent contamination of the fluid contained in the bottle by other atmospheric impurities which may be harmful in certain cases, for example nitrogen and/or oxygen when the fluid in the bottle is argon and/or helium, argon and $CO_2$, or any other gas mixture.

The present invention is not limited to the fluid containers intended only for the welding field, which field includes the processes of welding itself and those of cutting, heat treatment and thermal spraying or the like, but may also be applied to fluid containers, especially gas containers, intended for other technical fields in which similar problems are likely to occur, for example the food field (bacteriological contamination) or the medical field.

What is claimed is:

1. A process for filling a filling container intended to contain pressurized fluid with a fluid, said container being fitted with a positive-pressure regulator having closure means which impede and/or prevent any inflow and/or any outflow of fluid when the pressure in the bottle falls below a specified positive pressure limit (PPL) value, in which process the fluid having a water or water-vapor content of less than 40 ppmv is introduced into the container after the inside of said filling container has been subjected to a drying operation.

2. The process as claimed in claim 1, characterized in that the closure means prevent any inflow of gas into or outflow of gas from the container for a positive pressure limit (PPL) of greater than $1.5 \times 10^5$ Pa and of less than $10 \times 10^5$ Pa, preferably the closure means comprising a valve flap and/or a spring means.

3. The process as claimed in claim 1, characterized in that the spring means has a stiffness equivalent to or proportional to the desired positive pressure limit (PPL).

4. The process as claimed in claim 1, characterized in that it contains a fluid at a pressure of between $10^5$ Pa and $300 \times 10^5$ Pa, the fluid preferably being in gaseous form, and/or characterized in that it is chosen from bottles made of a metal, a metal alloy or a composite.

5. The filling process as claimed in claim 1, characterized in that the drying operation is carried out by flushing the inside of the bottle with a stream of dry gas, preferably a dry gas of the same composition or of the same nature as the fluid subsequently introduced into the bottle.

6. The filling process as claimed in claim 1, characterized in that, while the inside of the bottle is being flushed, a change in the water or water-vapor content in the bottle is permanently monitored.

7. The filling process as claimed in claim 6, characterized in that the drying operation is stopped when the water or water-vapor content in the bottle is below 20 ppmv, preferably below 5 ppmv.

8. The process as claimed in claim 1, characterized in that the introduction of the fluid into the container is stopped when the pressure exerted in said container is between $100 \times 10^5$ Pa and $400 \times 10^5$ Pa, preferably between $150 \times 10^5$ Pa and $300 \times 10^5$ Pa.

9. The process as claimed in claim 1, characterized in that the fluid is a gas chosen from argon, helium, oxygen, $CO_2$, nitrogen, CO, nitrogen oxides ($N_xO_y$), $SO_2$, $SF_6$, xenon, neon, krypton, hydrogen, $CH_4$, $SiH_4$, $C_2H_4$ and mixtures thereof.

10. Use of a filling container fitted with a regulator of the positive-pressure type and having been filled by a process as claimed in claim 1, containing a fluid at a pressure of between $5 \times 10^5$ Pa and $400 \times 10^5$ Pa, in a welding operation, particularly a TIG, MIG or MAG welding operation, or a plasma cutting operation.

* * * * *